June 29, 1943.    W. ERNST    2,323,021
RELIEF VALVE
Original Filed July 26, 1941
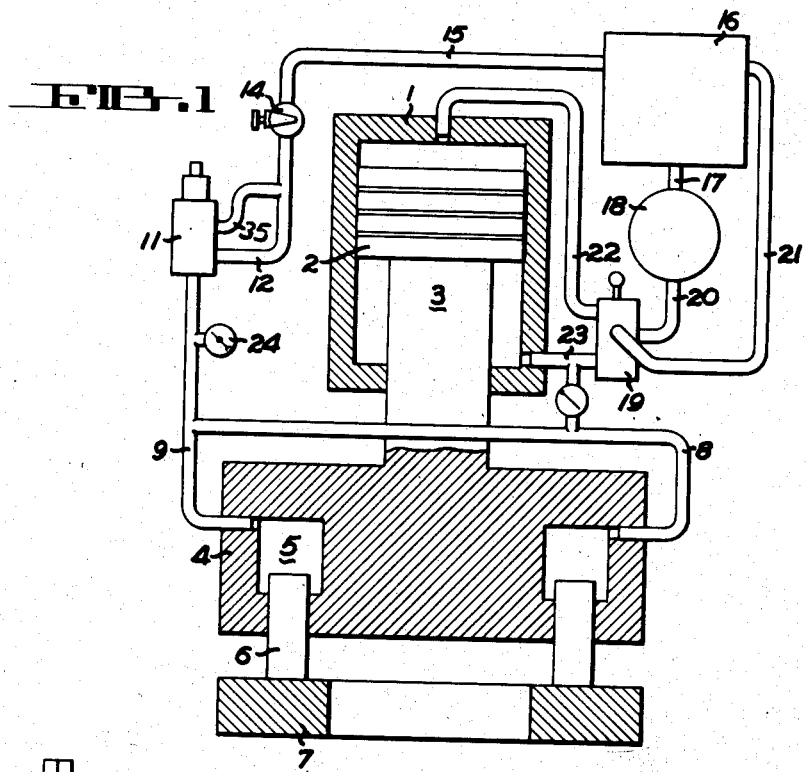
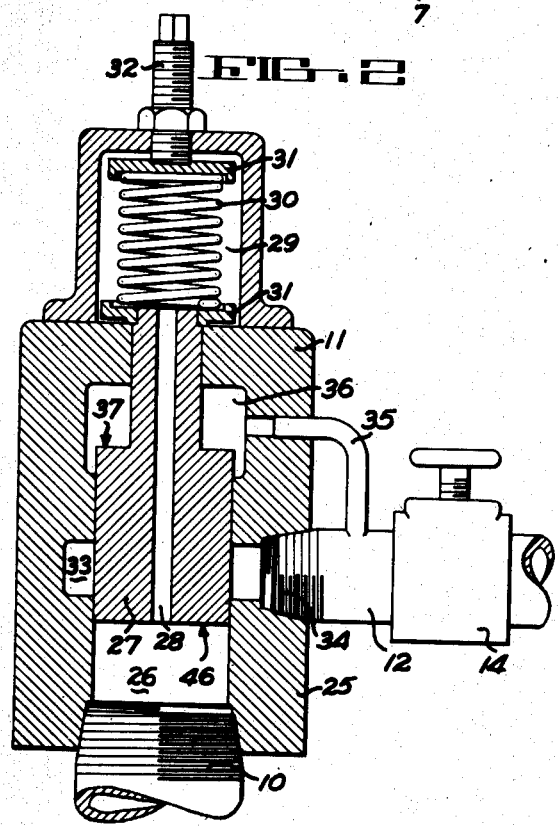
INVENTOR
WALTER ERNST
ATTORNEYS Patented June 29, 1943

2,323,021

UNITED STATES PATENT OFFICE 2,323,021

RELIEF VALVE

Walter Ernst, Mount Gilead, Ohio, assignor to The Hydraulic Development Corporation, Inc., Wilmington, Del., a corporation of Delaware Original application July 26, 1941, Serial No. 404,219. Divided and this application October 20, 1941, Serial No. 415,697

6 Claims. (Cl. 137—53)

This invention relates to valves and, more particularly, to improvements in relief valves which, in response to a predetermined pressure acting thereupon, release an outlet opening to relieve pressure therethrough.

Most of the relief valves heretofore known have the drawback that, when using high pressure and correspondingly strong control springs, the valve member vibrates violently and frequently causes breakage of delicate gauges connected thereto. Moreover, these known devices make it impossible to stabilize the desired pressure.

In my copending application, Serial No. 404,219, filed July 26, 1941, of which the present application is a division, there is disclosed a relief valve which overcomes the above mentioned drawback by admitting fluid pressure into the chamber housing the control spring.

It is an object of the present invention to further improve the valve structure disclosed in my said copending application No. 404,219 so as to enable a lighter construction thereof.

It is a further object to provide a spring controlled pressure relief valve with a differential valve member, in which the thrust of the spring is aided by fluid pressure acting on said differential valve member.

These and other objects and advantages of the invention will appear more clearly in the following specification in connection with the accompanying drawing, in which:

Figure 1 diagrammatically illustrates a hydraulic press circuit in connection with a relief valve, as shown in Figure 2.

Figure 2 shows an embodiment of the invention with a passageway interconnecting the spring chamber and the area upon which acts the pressure to be controlled.

General arrangement

In general, the valve according to the invention comprises a spring chamber which houses the control spring for opposing the movement of the valve member.

According to an embodiment of the invention, the spring chamber continuously communicates through a passage in the valve member with an area on the valve member continuously acted upon by the pressure to be controlled. The pressure in the valve chamber acts somewhat like a shock absorber or stabilizer, thereby enabling a smooth opening of the valve and a stabilization of the valve member in its releasing position when a predetermined pressure has acted upon the said area.

Structural arrangement

Referring now to the drawing in detail, Figure 1 diagrammatically illustrates a hydraulic press circuit in connection with a relief valve according to the invention.

The hydraulic circuit of Figure 1 comprises a main cylinder 1 having reciprocably mounted therein a double-acting piston 2 connected by a ram 3 with a platen 4, which in its turn comprises clamping cylinders 5. Reciprocably mounted in the clamping cylinders 5 are clamping plungers 6 connected to a clamping platen 7.

The clamping cylinders 5 communicate with conduits 8 and 9 interconnected with each other and leading to the inlet opening 10 of the pressure relief valve 11.

The valve 11 as shown in Figures 1 and 2 communicates through conduits 12 and 35 with the inlet port of an adjustable choke or throttle 14, which in its turn communicates with a conduit 15 leading to a fluid reservoir or surge tank 16. The tank 16 is connected with the suction line 17 of a fluid pump 18 of any desired type, the pressure side of which communicates with a four-way valve 19 through a conduit 20. The valve 19 has a fluid connection 21 to the tank 16, a fluid connection 22 to the upper portion of the main cylinder 1, and a fluid connection 23 to the lower portion of the main cylinder 1.

The relief valve 11 is set for a desired pressure in the clamping cylinders 5 and, when the clamping platen 7 at the downward stroke of the ram 3 engages the work piece and thereby comes to a halt, while the ram 3 continues its downward movement, pressure builds up in the clamping cylinders 5 which, at the attainment of a predetermined value determined by the setting of the relief valve, causes the latter to open. The clamping pressure in the clamping cylinders 5 may be observed on the gauge 24.

The pressure relief valve shown in Figures 1 and 2 comprises a casing 25 with the inlet opening 10 adapted to be connected to the pressure line 9 and leading to the cylinder bore 26 in the valve casing 25.

Reciprocably mounted in the cylinder bore 26 is a valve member 27 with a longitudinal bore 28 therethrough, which latter continuously connects the inlet opening 10 with a spring casing or spring chamber 29 arranged on top of the valve casing 25. The spring casing 29 houses a spring 30, the lower end of which rests upon a disc 31 which is supported by the valve member 27 and may be connected thereto in any convenient manner.

The upper end of spring 30 is engaged by a disc 31 held in its position by an adjustable screw 32. By adjusting the screw 32, the pressure of the spring 30 may be varied in accordance with the desired setting of the valve.

The valve casing 25 comprises an annular passageway 33 surrounding the valve member 27 and communicating with an outlet port 34 which is connected with the conduit 12. Branching off from the conduit 12 is a conduit 35 leading to a differential chamber 36 in the casing 25 for conveying fluid pressure from the conduit 12 to the differential piston area 37.

*Operation*

Supposing that the pressure in the clamping cylinders 5 increases beyond the pressure for which the relief valve 11 has been set, it will be clear that the pressure in the clamping cylinders 5 acts through conduit 9 upon the main area 46 of the valve member 27 and lifts the same against the pressure of the spring 30. As soon as the valve 27, during this lifting movement, releases the outlet port 34, pressure from the conduit 9 is released into the conduit 12. Due to the provision of the choke or throttle 14, a back pressure builds up in conduit 12 and is conveyed through conduit 35 into the differential chamber 36 where it acts upon the differential area 37. This pressure aids the spring 30, thereby bringing about a stabilization of the valve member 27 so that chattering of the valve member 27 is prevented and a predetermined pressure maintained in the clamping cylinders 5.

Due to the passageway 28, pressure is continuously conveyed from the inlet opening 10 into the spring chamber 29. The fluid pressure prevailing in the spring chamber 29 and continuously conveyed thereto from the inlet opening 10 has a stabilizing influence on the valve member 27, so as to prevent jumping of the valve member at each slight change in the pressure acting upon the main area 46.

It will be understood that I desire to comprehend within my invention such modifications as come within the scope of the claims and the invention.

Having thus fully described my invention what I claim as new and desire to secure by Letters Patent is:

1. In combination in a valve, a valve casing having an inlet port adapted to be connected with a pressure line and an outlet port adapted to be connected with an exhaust line, a valve member reciprocable in said casing and movable selectively into opening or closing position for opening or closing said outlet port, said valve member having a first area adjacent said inlet port and an opposed smaller area and also being provided with an extension, yielding means acting on said extension for continuously urging said valve member into closing position, means responsive to a predetermined pressure acting on said first area for hydraulically interconnecting said first area and said smaller area, and means for conveying fluid pressure from said first area through said valve member to said extension to aid said yielding means in urging said valve member into its closing position.

2. In combination in a valve, a valve casing having an inlet port for connection with a pressure line and an outlet port for connection with an exhaust line, a valve member reciprocable in said casing and movable selectively into opening or closing position for opening or closing said outlet port, said valve member having a first area adjacent said inlet port and an opposed smaller area and also being provided with an extension extending into a spring chamber, spring means provided in said chamber and acting upon said extension for continuously urging said valve member into closing position, conduit means continuously effecting fluid connection between said inlet port and said extension for aiding said spring means in urging said valve member into its closing position, and means responsive to a predetermined pressure on said first area for supplying pressure fluid from said first area to said smaller area.

3. In combination in a valve, a valve casing having an inlet port for connection with a pressure line and an outlet port for connection with an exhaust line, a valve member reciprocable in said casing and movable selectively into opening or closing position for opening or closing said outlet port, said valve member having a first area adjacent said inlet port and an opposed smaller area, spring means arranged in a spring chamber and acting upon an extension of said valve member for continuously urging said valve member into closing position, conduit means continuously establishing fluid connection between said inlet port and said extension to convey fluid to the latter for aiding said spring means in urging said valve member into closing position, means responsive to movement of said valve member into opening position for conveying fluid pressure from said first area to said smaller area, and means associated with said last mentioned means for maintaining a predetermined miinmum pressure on said smaller area while said valve member is in its opening position.

4. In combination in a valve, a valve casing having an inlet port for connection with a pressure line and an outlet port for connection with an exhaust line, a valve member reciprocable in said casing and movable selectively into opening or closing position for opening or closing said outlet port, said valve member having a first area adjacent said inlet port and an opposed smaller area and also being provided with an extension, spring means arranged in a spring chamber and engaging said extension for continuously urging said valve member into closing position, conduit means continuously establishing fluid connection between said inlet port and said extension to convey fluid from said inlet port to said extension for aiding said spring means in urging said valve member into its closing position, choke means for building up back pressure at said outlet port, and conduit means interposed between said choke means and said outlet port and communicating with the latter for conveying pressure from said first area to said smaller area in response to the movement of said valve member into opening position.

5. In combination in a valve, a valve casing having a main chamber and an auxiliary chamber, said main chamber being provided with an inlet and an outlet opening, a valve member reciprocably mounted in said chambers and having a main area cooperating with said main chamber and an oppositely located auxiliary area cooperating with said auxiliary chamber, said main area being larger than said auxiliary area, a spring chamber connected to said casing, reciprocable means arranged in said chamber and connected to said valve member, spring means acting upon said reciprocable member for continuously urging said valve member into position for closing said outlet opening, conduit means for continuously hydraulically connecting said main chamber with said spring chamber for conveying fluid pressure from said main chamber to said reciprocable means to aid said spring means in urging said valve member into closing position, and means responsive to the release of said outlet opening by said valve member for conveying additional fluid pressure from said main chamber to said auxiliary chamber to further aid said spring means in its tendency to move said valve member into closing position.

6. In combination in a valve comprising a valve casing with a valve bore having an inlet and an outlet opening, a differential plunger reciprocably mounted in said bore and having a main area, adapted to be acted upon by pressure fluid admitted through said inlet opening, for moving said plunger into position for releasing said outlet opening, a chamber associated with said casing and housing yielding means for continuously urging said plunger into position for closing said outlet opening, a passageway through said plunger for continuously effecting hydraulic connection between said inlet opening and said chamber to convey pressure fluid into said chamber for acting on said plunger in the same direction as said yielding means, conduit means connecting said outlet opening with an auxiliary area on said plunger oppositely directed to said main area, said conduit means being adapted in response to the release of said outlet opening to convey pressure fluid from said inlet opening to said auxiliary area to aid said yielding means in urging said plunger into closing position, and means associated with said conduit means for creating a predetermined back pressure at said outlet opening.

WALTER ERNST.